United States Patent
Francis et al.

(10) Patent No.: US 8,337,803 B2
(45) Date of Patent: *Dec. 25, 2012

(54) ADDITIVES FOR REMOVAL OF METALS POISONOUS TO CATALYSTS DURING FLUIDIZED CATALYTIC CRACKING OF HYDROCARBONS

(75) Inventors: Julie Ann Francis, Houston, TX (US); Charles Vadovic, Houston, TX (US)

(73) Assignee: Albemarle Netherlands B.V., Amsterdam (NL)

(*) Notice: Subject to any disclaimer, the term of this patent is extended or adjusted under 35 U.S.C. 154(b) by 0 days.

This patent is subject to a terminal disclaimer.

(21) Appl. No.: 12/917,083

(22) Filed: Nov. 1, 2010

(65) Prior Publication Data

US 2011/0042271 A1 Feb. 24, 2011

Related U.S. Application Data

(63) Continuation of application No. 11/771,826, filed on Jun. 29, 2007.

(60) Provisional application No. 60/817,383, filed on Jun. 29, 2006.

(51) Int. Cl.
B01J 20/04 (2006.01)

(52) U.S. Cl. ............ 423/594.16; 423/600; 423/625; 423/629; 502/414; 208/106; 208/113; 208/118; 208/119; 208/120.01; 208/120.25; 208/121; 208/122

(58) Field of Classification Search .......... 423/594.16, 423/600, 625, 629; 208/253; 502/414
See application file for complete search history.

(56) References Cited

U.S. PATENT DOCUMENTS

| 4,284,762 A | 8/1981 | Miyata et al. |
| 4,312,919 A | 1/1982 | Devanney |
| 4,347,353 A | 8/1982 | Miyata et al. |
| 4,377,494 A | 3/1983 | Bertus et al. |
| 4,473,463 A | 9/1984 | Bertus et al. |
| 4,485,184 A | 11/1984 | Hettinger et al. |
| 4,743,358 A | 5/1988 | Kugler et al. |
| 4,889,615 A | 12/1989 | Chin et al. |
| 5,057,205 A | 10/1991 | Chin et al. |
| 5,179,063 A | 1/1993 | Harris et al. |
| 5,300,469 A | 4/1994 | Deeba et al. |
| 5,324,416 A | 6/1994 | Cormier et al. |
| 5,384,041 A | 1/1995 | Deeba et al. |
| 5,817,596 A * | 10/1998 | Akporiaye et al. .......... 502/327 |
| 6,010,619 A * | 1/2000 | Wise et al. ............. 208/120.01 |
| 6,028,023 A | 2/2000 | Vierheilig |
| 6,156,696 A | 12/2000 | Albers et al. |
| 6,159,887 A | 12/2000 | Trujillo et al. |
| 6,261,530 B1 | 7/2001 | Breuer et al. |
| 6,497,811 B1 * | 12/2002 | Myrstad et al. ............. 208/113 |
| 6,541,409 B1 | 4/2003 | Jones et al. |
| 6,589,902 B1 | 7/2003 | Stamires et al. |
| 6,610,255 B1 | 8/2003 | Cao et al. |
| 6,800,578 B2 | 10/2004 | Stamires et al. |
| 7,008,896 B2 | 3/2006 | Stamires et al. |
| 7,022,304 B2 | 4/2006 | Stamires et al. |
| 2002/0159940 A1 * | 10/2002 | Stamires et al. ............. 423/326 |
| 2005/0121362 A1 | 6/2005 | Vierheilig et al. |
| 2006/0060504 A1 | 3/2006 | Vierheilig |

FOREIGN PATENT DOCUMENTS

| EP | 0209240 B1 | 3/1990 |
| WO | 9949001 A1 | 9/1999 |
| WO | 0001482 A1 | 1/2000 |
| WO | 2005058488 A2 | 6/2005 |
| WO | 20050102514 A1 | 11/2005 |
| WO | 20050102515 A1 | 11/2005 |

OTHER PUBLICATIONS

Dictionary of Geology and Mineralogy, $2^{nd}$ ed.(2003), McGraw-Hill, 420 pgs.*
Miyata, S. (1983). Clay and Clay Minerals, 31(4), 305-311.*
Li, Z. et al. (1994). Langmuir, 10, 330-333.*
Luis Cedeno Caero, et al; "Traps for Simultaneous Removal of SOx and Vanadium in FCC Process;" Catalysis Today; 2005; vol. 107-108; pp. 657-662; Elsevier B.V.
Silvia Martinez, et al; "Reducibility, Heats of Re-Oxidation, and Structure of Vanadia Supported on TiO2-Al2O3 Supports Used As Vanadium Traps in FCC;" Thermochimica Acta; 2005; vol. 434; pp. 74-80; Elsevier B.V.
H. S. Cerqueira, et al; "The Influence of Experimental Errors During Laboratory Evaluation of FCC Catalysts," Applied Catalysis A:General; 1999; vol. 181; pp. 209-220; Elsevier Science B.V.
Trond Myrstad, et al; "Effect of Vanadium on Octane Numbers In FCC-Naphtha;" Applied Catalysis A:General; 1997; vol. 155; pp. 87-98; Elsevier Science B.V.
C. A. Altomare, et al; "A Designed Fluid Cracking Catalyst With Vanadium Tolerance;" Chemistry of Materials; 1989; vol. 1; No. 4; pp. 459-463; American Chemical Society.
Runsheng Zhuo, et al; "Influence of Vanadium Poisoning and Vanadium Trap on the Physicochemical and Catalytic Properties of Y Zeolite;" Book of Abstracts, 216th ACS National Meeting, Boston, Aug. 23-27, 1998; vol. PETR; No. 046; American Chemical Society, Washington, D.C.
Gao Yongcan, et al; "Studies on Effects of Vanadium Trapping Agents on Different FCC Zeolite Catalysts;" China Petroleum Processing and Petrochemical Technology; Mar. 2000; vol. 1; pp. 49-53; China Petroleum Processing and Petrochemical Technology Press *Supplied by the British Library).
Pan Huifang, et al; "The Design of Vanadium Trapping System for FCC Catalysts:" Chinese Journal of Chemical Engineering; 1996; vol. 4; No, 2; pp. 120-124; Chemical Industry Press.
Runsheng Zhuo, et al; "Effect of Vanadium Poisoning and Vanadium Trapping Agent on Structure and Property of REHY Zeolite;" Preprints—American Chemical Society, Division of Petroleum Chemistry; 1998; vol. 43; No. 2; pp. 332-333; American Chemical Society.

(Continued)

Primary Examiner — Brian McCaig
(74) Attorney, Agent, or Firm — James A. Jubinsky

(57) ABSTRACT

Compositions and methods suitable for removing poisonous metals from hydrocarbons are provided. The compositions comprise hydrotalcite having one or more trapping metals dispersed on the outer surface thereof.

8 Claims, No Drawings

OTHER PUBLICATIONS

Ulrich Alkemade, et al; "Novel FCC Catalyst Systems for Resid Processing:" Catalysts in Petroleum Refining and Petrochemical Industries; 1995; pp. 339-354; Elsevier Science B.V.

T. Sadoh, et al; "Diffusion of Vanadium in Silicon;" Applied Physics Letters; 1991; vol. 58; No. 15; pp. 1653-1655; American Institute of Physics.

Lori T. Boock, et al; "New Developments in FCC Catalyst Deactivation by Metals: Metals Mobility and the Vanadium Mobility Index (VMI);" Studies in Surface Science and Catalysis; 1997; vol. 111 (Catalyst Deactivation 1997); pp. 367-374; Elsevier Science B.V.

D. J. Rawlence, et al; "Design and Preparation of Vanadium Resistant FCC Catalysts;" Studies in Surface Science and Catalysis; 1991; vol. 63 (Preparation of Catalysts V); pp. 407-419; Elsevier Sciences Publishers B.V., Amsterdam.

Francisco Hernandez-Beltran, et al: "TPR and CO2-TPD of Composite Titania (Anatase)—Alumina Systems As Potential Vanadium traps for Fluid Catalytic Cracking (FCC);" Studies in Surface Science and Catalysis; 2000; vol. 130C (International Congress on Catalysis 2000, Pt. C); pp. 2459-2464; Elsevier Science B.V.

Bruce Lerner, et al; "Improved Methods for Testing and Assessing Deactivation From Vanadium Interaction With FCC Catalyst:" Preprints—American Chemical Society, Division of Petroleum Chemistry; 1995; vol. 40; No. 3; pp. 487-490; American Chemical Society.

Timothy J. Dougan, et al; "New Vanadium Trap Proven in Commercial Trials:" Oil & Gas Journal; Sep. 26, 1994; vol. 92; No. 39; pp. 81-82, 84, 86, 89-91; PennWell Publishing.

Anonymous; "Additives Play Important Role in FCC Development:" Oil & Gas Journal; Sep. 23, 1991; vol. 89; No. 38; pp. 50-52; PennWell Publishing.

Bruce Lerner, et al; "Improved Methods for Testing and Assessing Deactivation From Vanadium Interaction With Fluid Catalytic Cracking Catalyst;" American Chemical Society Symposium Series; 1996; vol. 634 (Deactivation and Testing of Hydrocarbon-Processing Catalysts); pp. 296-311; American Chemical Society.

Richard F. Wormsbecher, et al; "Vanadium Mobility in Fluid Catalytic Cracking;" Preprints—American Chemical Society, Division of Petroleum Chemistry; 1995; vol. 40; No. 3; pp. 482-486; American Chemical Society,.

Runsheng Zhuo, et al; "Effect of Vanadium Deposition and Vanadium Traps on the Structure and performance of the FCC Catalyst;" Preprints—American Chemical Society, Division of Petroleum Chemistry; 1998; vol. 43; No. 2; pp. 328-331.

Estaban Lopez-Salinas, et al; "New Gallium-Substituted Hydrotalcites: [Mg1-xGax(OH)2](CO3)x/2• mH20;" Journal of Porous Materials; 1996; vol. 3; pp. 169-174; Kluwer Academic Publishers; Dordrecht, Netherlands.

* cited by examiner

ADDITIVES FOR REMOVAL OF METALS POISONOUS TO CATALYSTS DURING FLUIDIZED CATALYTIC CRACKING OF HYDROCARBONS

REFERENCE TO RELATED APPLICATIONS

This application is a continuation of copending U.S. application Ser. No. 11/771,826, filed Jun. 29, 2007, which is incorporated herein by reference.

BACKGROUND

One major operation in the modern refinery is the process of catalytic cracking. In this process, some of the heavier oils (often called "gas oils") produced upon fractionation of whole crude oil are decomposed or "cracked" using fluidized zeolite-containing catalysts.

As the supply of light, sweet crude oils has dwindled during past years, catalytic cracking has become increasingly important in maintaining a supply of hydrocarbons suitable for use in various fuels such as gasoline. A problem that has occurred because of the increasing use of heavier, more sour crudes is that the heavier crudes contain substantially more organic metal compounds, such as vanadium and nickel porphyrins. These metals cause many undesirable reactions in heavy oil cracking in that the metals, specifically nickel and vanadium, are quite harmful to the fluidized cracking catalysts used. These metals, present in the high-boiling fractions, deposit on cracking catalyst and accumulate with time. They act as poisons and have the resulting effect of increasing undesirable hydrogen and coke yields, decreasing the selectivity of the catalyst in making liquid products. It is also established that vanadium also attacks the zeolite itself, the high activity component of a catalytic cracking catalyst.

Much effort has been made by those in the refinery/refinery catalyst industry to attempt to deal with the problem of vanadium and other metals poisonous to zeolite-containing catalysts during fluidized catalytic cracking (FCC). U.S. Pat. No. 6,610,255 describes many technologies that have been proposed. The vast majority of these technologies deal with the addition of so-called "trapping agents", either with the catalyst or with the hydrocarbon feed; and these trapping agents, such as barium, calcium, and strontium have been shown to reduce the deleterious effects of poisonous metals on zeolite-containing FCC catalysts.

In spite of recent developments in FCC catalyst technology, a need still exists for a commercially feasible means for introducing trapping agents during FCC for effectively removing vanadium and other poisonous metals from hydrocarbons.

THE INVENTION

This invention fulfills the current need by providing compositions and methods suitable for removing one or more poisonous metals from hydrocarbons. Compositions according to this invention comprise hydrotalcite (HTC) having one or more trapping metals dispersed on the outer surface thereof. Methods for removing one or more poisonous metals from hydrocarbons in an FCC unit according to this invention comprise adding to the FCC unit hydrotalcite having one or more trapping metals dispersed on the outer surface thereof. In some embodiments of this invention, compositions of this invention consist essentially of, or consist of, hydrotalcite having at least one trapping metal dispersed on the outer surface thereof. Using HTC as a carrier for one or more trapping agents dispersed thereon provides good contact between poisonous metals and trapping agents.

While this invention will be described in connection with specific embodiments, it is understood that this invention is not limited to any one of these specific embodiments.

Hydrotalcite

Any hydrotalcite can be used in the present invention. The hydrotalcite can comprise (a) naturally occurring hydrotalcite, (b) synthetic hydrotalcite, (c) a hydrotalcite-like material, or (d) a mixture of any two or more of (a)-(c). Suitable hydrotalcite carriers are described in U.S. Pat. Nos. 4,347,353 and 4,284,762. Suitable hydrotalcite carriers include mixed metal oxides of CaO, MgO, and Al2O3, for examples. One suitable hydrotalcite has a chemical formula of $Mg_{4.5}Al_2(OH)_{13}CO_3 \cdot 3.5H_2O$, Suitable hydrotalcite materials are manufactured by Kyowa Chemical Industry Company, Ltd., Osaka, Japan, and are marketed by Mitsui and Company, Ltd., Osaka, Japan, and by Mitsui and Company (USA), Inc., Houston, Tex., under the product designations of "DHT-4" and "DHT-4A".

Hydrotalcite-Like Materials and Methods of Making Same

Crystalline anionic clays, including, meixnerite, sjogrenite, pyroaurite, stichtite, reevesite, eardleyite, manassite, and barbertonite, are hydrotalcite-like materials according to this invention. For most commercial applications crystalline anionic clays are formed into shaped bodies such as spheres. In applications where shaped bodies are exposed to severe processing conditions and environments, such as oil refinery applications, separations, purifications, and absorption processes, it is important that the integrity of the crystalline anionic clay-containing shaped bodies is kept intact and attrition is prevented. A process for the preparation of crystalline anionic clay-containing bodies from sources comprising an aluminum source and a magnesium source comprises the steps of: a) preparing a precursor mixture, b) shaping the precursor mixture to obtain shaped-bodies, c) optionally thermally treating the shaped bodies, and d) aging to obtain crystalline anionic clay-containing bodies. The shaped bodies can be prepared in various ways. In one embodiment, an aluminum source and a magnesium source are combined in a slurry to form a precursor mixture. Subsequently, said precursor mixture is shaped. The resulting shaped bodies are aged, optionally after thermal treatment, in a liquid to obtain crystalline anionic clay-containing bodies.

It is also possible to prepare a precursor mixture from only one source such as an aluminum source or a magnesium source, shape it, and then add one or more additional other sources to the shaped bodies in any of the subsequent process steps. During the aging step, the various sources react to give the crystalline anionic clay-containing bodies. Of course, it is also possible to use combinations of the two preparation routes described above, for instance: add; the aluminum source and the magnesium source to form the precursor mixture, shape to form bodies, and then age the shaped bodies in a liquid containing additional magnesium source to form anionic clay-containing bodies with a higher magnesium content on the outside of the shaped body.

Suitable alumina sources include aluminum oxides and hydroxides such as transition alumina, aluminum trihydrate (gibbsite, bayerite) and its thermally treated forms (including flash calcined alumina), sols, amorphous alumina, (pseudo) boehmite, aluminum-containing clays such as kaolin, sepiolite, hydrotalcite, and bentonite, modified clays such as metakaolin, alumina salts such as aluminum nitrate, aluminum chloride, aluminum chlorohydrate, sodium aluminate. With the preparation methods described herein it is also possible to use cruder grades of aluminum trihydrate such as BOC (Bauxite Ore Concentrate) or bauxite. When clays are used as an Al-source, it may be necessary to activate the alumina in the clay by acid or base treatment, for instance acid-treated bentonite, (hydro)thermal treatment, or combinations thereof. Acid treatment comprises treatment with nitric acid, acetic acid, phosphoric acid, sulfuric acid, hydrochloric acid, and the like. Thermal treatment is usually performed at temperatures ranging from 30° C. to 1000° C., sometimes from 200° C. to 800° C., for a time ranging from several minutes to 24 hours, sometimes from 1-10 hours. Also mixtures of the above-mentioned aluminum sources can be used, and said different aluminum sources can be combined in the precursor mixture in any sequence. It is also possible to add an aluminum source after the shaping step. In that case, the precursor mixture may or may not already contain an aluminum source. In one embodiment, if an aluminum source is added after the shaping step, it is in liquid when contacted with the shaped bodies. This can be done by dispersing or dissolving the aluminum source and adding it to the shaped bodies. Alternatively, the aluminum source can be added to the liquid in which the shaped bodies are aged.

Also, other aluminum sources than clay, such as aluminum trihydrate, may be pre-treated prior to the addition to the precursor mixture or prior to contacting it with the shaped bodies. Said pre-treatment may involve treatment with acid, base treatment, thermal and/or hydrothermal treatment, all optionally in the presence of seeds or combinations thereof. It is not necessary to convert all of the aluminum source into crystalline anionic clay. Any excess aluminum will be converted into silica-alumina, alumina (usually in the form of γ-alumina or (crystalline) boehmite) and/or alumina-magnesia during the aging step. These compounds improve the binding properties of the shaped bodies and may also provide different types of desirable functionalities for the bodies. For instance, silica-alumina and alumina provide acid sites for catalytic cracking and alumina (crystalline) boehmite also improves the nickel encapsulation capacity of the shaped bodies. The formation of, for example, (crystalline) boehmite may be promoted by adding seeds, either in the precursor mixture, in the aluminum source or during aging.

Suitable magnesium sources include magnesium oxides or hydroxides such as MgO, Mg(OH)$_2$, hydromagnesite, magnesium salts such as magnesium acetate, magnesium formate, magnesium hydroxy acetate, magnesium carbonate, magnesium hydroxy carbonate, magnesium bicarbonate, magnesium nitrate, magnesium chloride, magnesium-containing clays such as dolomite, saponite, sepiolite. Also mixtures of the above-mentioned magnesium sources can be used, and said different magnesium sources can be combined in the precursor mixture in any sequence and/or in any process step after the shaping step. In one embodiment, if a magnesium source is added after the shaping step, it is in liquid when contacted with the shaped bodies. This can be done by dispersing or dissolving the magnesium source and adding it to the shaped bodies. Alternatively, the magnesium source can be added to the liquid in which the shaped bodies are aged.

The magnesium source may be pre-treated prior to the addition to the precursor mixture and/or prior to the addition to the shaped bodies. Said pretreatment may comprise a thermal and/or a hydrothermal treatment, an acid treatment, a base treatment, all optionally in the presence of a seed, and/or combinations thereof.

It is not necessary to convert all of the magnesium source into crystalline anionic clay. Any excess magnesium will usually be converted into brucite, magnesia or alumina-magnesia. For the sake of clarity, this excess of magnesium compounds in the shaped particle will be referred to in the description as magnesia. The presence of magnesia or alumina-magnesia in the shaped body may provide desirable functionalities to the shaped bodies. The presence of magnesia provides basic sites that render the shaped body suitable for removing or neutralizing strong acid streams of gases or liquids.

The various process steps will be described in more detail below.

Hydrotalcite-Like Materials and Methods of Making Same—Preparation of the Precursor Mixture In this step a precursor mixture is prepared from an aluminum source and/or a magnesium source in a liquid. In fact, all liquids are suitable, as long as they do not detrimentally interfere with the various sources. Suitable liquids are water, ethanol, propanol, and the like. The amount of liquid can be chosen such that a mixture with a milky substance is obtained, but also mixtures with a higher viscosity, for instance doughs, are suitable. If more than one source is used for the precursor mixture, the sources can be added as solids, but they can also be added in liquid. The various sources can be added in any sequence. The preparation of the precursor mixture can be carried out with or without stirring, at room temperature or elevated temperature. Optionally, the precursor mixture and/or the separate sources are homogenized by, for instance, milling. Some conversion to crystalline anionic clay may already take place upon combining the various sources. In some instances, at least about 5 wt % of the final total amount of anionic clay is already formed, and in some instances conversion also takes place after the shaping step. In other instances more than about 25 wt %, or more than about 50 wt %, or more than about 75 wt %, or between about 80 to about 95 wt % of the final amount of anionic clay in the shaped body is formed after the shaping step. The Mg:Al ratio may vary, e.g., from about 1 to about 10, from about 1 to about 6, or from about 2 to about 4.

If desired, organic or inorganic acids and bases, for example for control of the pH, may be added to the precursor mixture or added to any one of the aluminum source and/or magnesium source before these are added to the precursor mixture. When an ammonium base modifier is used, upon drying, no deleterious cations remain in the anionic clay. The precursor mixture may be preaged prior to the shaping step. Said pre-aging temperature may range from about 30° C. to about 500° C. and may be conducted under atmospheric or increased pressure such as autogeneous pressure at temperatures above about 100° C. The aging time can vary from about 1 minute to several days, for instance about 7 days. By adding specific anions to the precursor mixture and/or any of the aluminum and or magnesium source the interlayer-charge balancing anions present may be controlled. Examples of suitable anions are carbonates, bicarbonates, nitrates, chlorides, sulfates, bisulfate's, vanadates, tungstates, borates, phosphates, pillaring anions such as V10O28-6, Mo7O24-6, PW12O40-3, B(OH)4-, B4O5(OH)4-2, HBO4-2, HGaO3-2, CrO4-2 formates, acetate, and mixtures thereof. It is also believed that the presence of some of these anions such as carbonate, bicarbonate, sulfate and or nitrate influences the forming of side products such as brucite. For instance, the addition of ammonium hydroxide promotes meixnerite formation, whereas the addition of ammonium carbonate promotes hydrotalcite formation.

Hydrotalcite-Like Materials and Methods of Making Same—Shaping

Suitable shaping methods include spray-drying, pelletising, extrusion (optionally combined with kneading), beading, or any other conventional shaping method used in the catalyst and absorbent fields or combinations thereof. The amount of liquid present in the precursor mixture used for shaping should be adapted to the specific shaping step to be conducted. It is sometimes advisable to (partially) remove the liquid used in the precursor mixture and/or add additional or other liquid, and/or change the pH of the precursor mixture to make the precursor mixture gellable and thus suitable for shaping. Various additives commonly used in the various shaping methods such as extrusion additives may be added to the precursor mixture used for shaping.

Hydrotalcite-Like Materials and Methods of Making Same—Thermal Treatment

After shaping, the shaped bodies may optionally be submitted to a thermal treatment. Such a treatment increases the physical strength of the particles. The thermal treatment can be conducted in an oxygen-containing atmosphere, in an inert atmosphere or in steam at temperatures varying from about 30° C. to about 900° C. for a time ranging from about a few minutes to about 24 hours. When, for instance, spray-drying a thermal treatment is inherently involved, a further thermal treatment may not be necessary.

Hydrotalcite-Like Materials and Methods of Making Same—Aging

In this step, the shaped bodies are immersed in a protic liquid or protic gaseous medium. During the aging step crystallization to crystalline anionic clay takes place. Suitable protic aging liquids or gaseous media are those liquids and gaseous media in which the shaped bodies do not dissolve, such as water, ethanol, methanol, propanol, steam, gaseous water, gaseous ethanol, and the like. Increasing the temperature of the liquid and/or the pressure can reduce the aging time. The aging can also be conducted under autogeneous conditions. The aging temperature may range from about 30° C. to about 500° C. The aging time can vary from about 1 minute to several days, for instance about 7 days. For some purposes, it is advantageous to conduct several aging steps, optionally with intermediate drying steps, optionally followed by calcination steps. For instance, an aging step with a temperature below about 100° C. may be followed by a hydrothermal aging step at a temperature above about 100° C. and autogeneous pressure, or vice versa. As will be described below in further detail, additives can be added before, after or during any aging step. By adding specific anions to the aging medium the interlayer-charge balancing anions present may be controlled. Examples of suitable anions are carbonates, bicarbonates, nitrates, chlorides, sulfates, bisulfates, vanadates, tungstates, borates, phosphates, pillaring anions such as V10O28-6, Mo7O24-6, PW12O40-3, B(OH)4-, B4O5(OH)4-2, HBO4-2, HGaO3-2, CrO4-2, formates, acetate, and mixtures thereof. It is also believed that the presence of some of these anions such as carbonate, bicarbonate, sulfate, and/or nitrate influence the forming of side products such as brucite. For instance, the addition of ammonium hydroxide promotes meixnerite-like clay formation, whereas the addition of ammonium carbonate promotes hydrotalcite-like clay formation.

For some applications, it is desirable to have additives present in and/or on the shaped bodies according to the invention, both metals and non-metals, such as rare earth metals (especially Ce and La), Si, P, B, Group VI metals, Group VII metals, noble metals such as Pt and Pd, alkaline earth metals (for instance Ca and Ba) and/or transition metals (for example Mn, Fe, Ti, V, Zr, Cu, Ni, Zn, Mo, Sn). Said metals and non-metals can be added separately or in mixtures in any of the preparation steps of the invention. For instance, they can easily be deposited on the shaped bodies before, during, or after aging, or else they can be added to the precursor mixture and/or any of the aluminum or magnesium sources. Suitable sources of metals or non-metals are oxides, halides, or any other salt, such as chlorides, nitrates, phosphates, and the like. As mentioned above, the metals and non-metals may be added in any of the preparation steps. This can be especially advantageous for controlling the distribution of the metals and non-metals in the shaped bodies. It is even possible to calcine the shaped bodies, rehydrate them and add additional additives.

With the help of additives, the shaped bodies may be provided with desired functionalities, or the desired functionality may be increased by the addition of additives. The suitability of anionic clay-containing shaped bodies for the removal of SOx and/or NOx compounds in FCC may be improved by the addition of Ce and/or V. The presence of V and Zn improves the suitability for removal of S-compounds in the gasoline and diesel fraction of FCC. As described above, these functionalities may also be built in by using and excess of aluminum source and/or magnesium source. A combination of these measures increases the effect.

The crystalline anionic clay-containing bodies may also be prepared to contain conventional catalyst components such as matrix or filler materials (e.g. clay such as kaolin, titanium oxide, zirconia, alumina, silica, silica-alumina, bentonite, and the like), molecular sieve material (e.g. zeolite Y, ZSM-5, and the like). Said conventional catalyst components may be added prior to the shaping step. Because the anionic clay is formed in situ, the resulting body will have a homogeneous dispersion of anionic clay and catalyst components. With the method according to the invention, multiple functional bodies can be prepared which can be used as a catalyst or as a catalyst additive.

The preparation process may be conducted batch-wise or in a continuous mode, optionally in a continuous multi-step operation. The process may also be conducted partly batch-wise and partly continuous.

If desired, the crystalline anionic clay-containing shaped bodies prepared by the process according to the invention may be subjected to ion exchange, in which the interlayer charge-balancing anions of the clay are replaced with other anions. Said other anions are the ones commonly present in anionic clays and include pillaring anions such as V10O28-6, Mo7O24-6, PW12O40-3, B(OH)4-, B4O5(OH)4-2, HBO4-2, HGaO3-2, CrO4-2. Examples of other suitable pillaring anions are given in U.S. Pat. No. 4,774,212. Said ion exchange can be conducted as soon as the crystalline anionic clay has been formed.

Trapping Agent

A suitable trapping agent can comprise any of the following elements, ions thereof, or mixtures of such elements and/or ions thereof: barium, calcium, manganese, lanthanum, iron, tin, zinc, cerium, or any element in Group 2, as identified in a Periodic Table of the Elements using the new IUPAC format (i.e., current IUPAC format).

The trapping agent can be comprised of at least one of barium and compounds of barium. It is presently believed that most forms of barium are effective. Barium titanate and barium oxide are suitable barium compounds for use as the trapping agent. The barium compounds suitable for use in the present invention can be organic or inorganic. Oil- and water-soluble barium compounds are suitable. Suitable inorganic barium compounds include barium salts of mineral acids and basic barium compounds. Barium oxide is a suitable trapping agent. Examples of suitable barium salts are barium nitrate, barium sulfate, barium halides such as barium chloride, and barium oxyhalides, such as $Ba(ClO_3)_2$. The halogen-containing inorganic compounds are less preferred because of their corrosive effect on process equipment. Representative basic barium compounds suitable for use are barium hydroxide, barium hydrosulfide and barium carbonate. Suitable organic barium compounds include the barium salts of carboxylic acids and barium-chelating agent complexes. The barium carboxylic acid salts can contain from about one to about 40 carbon atoms per molecule and the acid moiety can be aliphatic or can be aromatic in nature. Representative compounds are barium acetate, barium butyrate, barium citrate, barium formate, and barium stearate. Suitable barium complexes include complexes in which barium has been incorporated by chelating agents such as 1,3-diketones, ethylenediamine tetraacetic acid and nitrilotriacetic acid. Barium pentanedionate is a suitable trapping agent.

Dispersion of Trapping Agent Onto the Outer Surface of Hydrotalcite

The trapping agent can be added to hydrotalcite while the hydrotalcite is being made according to the procedures described herein or according to other procedures now known or subsequently developed. Alternatively, the trapping agent can be added to existing hydrotalcite, for example, by pore volume impregnation or by use of a soluble barium source, as will be familiar to those skilled in the art. Using any of these methods, at least a portion of the trapping agent will be dispersed on the outer surface of the hydrotalcite.

While this invention is not limited to any particular amount of trapping agent on the outer surface of the hydrotalcite, in one composition according to this invention, hydrotalcite having trapping agent dispersed on the outer surface thereon in the range of about 5 wt % to about 35 wt %, or about 10 wt % to about 20 wt %, based on the total weight of the trapping agent and the hydrotalcite, is useful.

Addition of Additive of this Invention to FCC

Compositions according to this invention can be added to an FCC unit with the hydrocarbon feed, simultaneously with one or more catalysts, or after the hydrocarbon feed and one or more catalysts have been added. In one embodiment, composition according to this invention is combined with one or more FCC catalysts such that the weight percent of the composition according to this invention based on the total weight of composition plus FCC catalyst(s) is from about 1 wt % to about 30 wt %, or about 2 wt % to about 20 wt %, or about 5 wt % to about 10 wt %.

EXAMPLES

Example 1

Me-HTC (where Me designates Ba, Sr, Ca, Fe, Mn, Ce, La or Zn) according to this invention was made by introducing the Me component as a salt to a 4:1 molar ratio $MgO:Al_2O_3$ slurry (at 20 wt % solids) that had been milled and aged. The mixture containing Me, Mg and Al was then spraydried to maintain an average particle size diameter around 75 micrometers. This dried material was then calcined at 550° C. for 1 hour and rehydrated in a water slurry at 30° C. for 30 minutes. The resultant mixture was then dried and blended with commercial FCC catalyst at a 10 wt % level. This blend was then evaluated in a fluidized bed micro-reactor unit using a resid feed after a metallated deactivation. The blend was deactivated using a Mitchell impregnation route followed by steaming at 3000 ppm Ni and 3000 ppm V. Table 1 illustrates the benefits of this invention. As compared to data generated with the use of the commercial FCC catalyst without the Me-HTC according to this invention, the coke yields are significantly reduced, while the conversion and gasoline yields are improved.

TABLE 1

| | CATALYST | | | | | | | | | |
|---|---|---|---|---|---|---|---|---|---|---|
| | BASE FCC CAT-ALYST | BASE FCC CAT-ALYST + Ba-HTC | BASE FCC CAT-ALYST + Sr-HTC | BASE FCC CAT-ALYST + Ca-HTC | BASE FCC CAT-ALYST + Fe-HTC | BASE FCC CAT-ALYST + Mn-HTC | BASE FCC CAT-ALYST + Ce-HTC | BASE FCC CAT-ALYST + La-HTC | BASE FCC CAT-ALYST + HTC | BASE FCC CAT-ALYST + Zn-HTC |
| Yields at constant Conversion = 73% | | | | | | | | | | |
| Catalyst-to-Oil wt/wt | 5.9 | 2.8 | 3.4 | 3.6 | 3.1 | 3.4 | 3.5 | 4.4 | 4.6 | 4.9 |
| Delta Coke, wt % | 2.1 | 2.0 | 2.2 | 1.9 | 2.9 | 2.3 | 2.4 | 2.0 | 2.4 | 1.9 |
| Coke | 12.5 | 5.7 | 7.6 | 6.9 | 8.9 | 7.6 | 8.3 | 8.8 | 11.0 | 9.4 |
| Dry gas | 5.8 | 4.7 | 5.0 | 5.3 | 5.2 | 5.1 | 5.3 | 5.3 | 5.5 | 5.4 |
| Gasoline | 41.7 | 46.1 | 45.1 | 44.6 | 43.8 | 44.5 | 44.1 | 43.9 | 42.3 | 43.7 |
| Bottoms | 9.7 | 10.2 | 10.4 | 10.5 | 10.3 | 10.9 | 10.4 | 10.6 | 11.2 | 10.3 |
| Net Bottoms Conversion | 77.7 | 84.1 | 82.0 | 82.6 | 80.8 | 81.5 | 81.3 | 80.5 | 77.8 | 80.2 |
| Yields at constant CTO = 5 | | | | | | | | | | |
| Conversion, wt % | 70.5 | 80.8 | 77.7 | 77.1 | 77.8 | 78.3 | 77.0 | 74.7 | 74.3 | 73.3 |
| Delta Coke, wt % | 2.2 | 1.8 | 2.1 | 1.8 | 2.2 | 2.0 | 2.1 | 1.9 | 2.4 | 1.9 |
| Coke | 11.0 | 9.0 | 10.6 | 9.2 | 11.2 | 9.9 | 10.4 | 9.5 | 11.8 | 9.6 |
| Gasoline | 42.0 | 43.3 | 43.5 | 43.9 | 43.2 | 43.7 | 43.1 | 43.8 | 42.1 | 43.7 |
| Bottoms | 11.6 | 6.4 | 7.8 | 8.1 | 7.8 | 7.8 | 8.2 | 9.5 | 10.3 | 10.2 |
| Yields at constant Coke = 10% | | | | | | | | | | |
| Conversion, wt % | 68.7 | 82.2 | 76.9 | 78.3 | 75.4 | 78.5 | 76.3 | 75.9 | 70.8 | 73.9 |
| Gasoline | 42.0 | 42.0 | 44.0 | 43.4 | 43.7 | 43.7 | 43.4 | 43.6 | 42.4 | 43.5 |
| Bottoms | 13.0 | 5.7 | 8.3 | 7.4 | 9.0 | 7.7 | 8.6 | 8.7 | 12.6 | 9.8 |

Example 2

Existing spraydried hydrotalcite was pore volume impregnated with barium. SEM photos of the particles and cross-sections together with element maps of Ba, Mg and Al show Ba on the outside surface of the hydrotalcite particles.

Example 3

Existing spraydried hydrotalcite was rehydrated in the presence of barium at 30 wt % solids for 30 minutes at 50° C., filtered and dried overnight at 110° C. SEM photos of the particles and cross-sections together with element maps of Ba, Mg and Al show Ba on the outside surface of the hydrotalcite particles.

Example 4

Slurried MgO/CATAPAL was milled to 2.5 pore size diameter and aged for 2 hours at 50° C. Barium nitrate was added, then the mixture was spraydried, calcined, and rehydrated in $H_2O$, SEM photos of the particles and cross-sections together with element maps of Ba, Mg and Al indicate Ba distribution that is inferior to Examples 2 and 3.

The use of an additive of this invention is expected to result in catalysts with improved metals resistance, which is quite valuable for resid units.

While the present invention has been described in terms of one or more preferred embodiments, it is to be understood that other modifications may be made without departing from the scope of the invention, which is set forth in the claims below.

The invention claimed is:

1. A composition suitable for removing one or more poisonous metals from hydrocarbons, said composition comprising a naturally-occurring or synthetic hydrotalcite having one or more trapping metals dispersed on the outer surface thereof, wherein one or more trapping metals comprises manganese, and a FCC catalyst.

2. The composition of claim 1, wherein said naturally-occurring or synthetic hydrotalcite has only one trapping metal, wherein said trapping metal is manganese.

3. The composition of claim 1, wherein said naturally-occurring or synthetic hydrotalcite is prepared from sources selected from the group consisting of an aluminum source and a magnesium source.

4. The composition of claim 3, wherein the magnesium to aluminum molar ratio is about 1 to about 10.

5. The composition of claim 3, wherein the magnesium to aluminum molar ratio is about 2 to about 4.

6. A method for removing one or more poisonous metals from hydrocarbons in an FCC unit, the method comprising adding to the FCC unit a naturally-occurring or synthetic hydrotalcite having one or more trapping metals dispersed on the outer surface thereof, wherein said one or more trapping metals comprises manganese.

7. A composition suitable for removing one or more poisonous metals from hydrocarbons, said composition comprising a FCC catalyst and a naturally-occurring or synthetic hydrotalcite having one or more trapping metals dispersed on the outer surface thereof, wherein said naturally-occurring or synthetic hydrotalcite is prepared from sources selected from the group consisting of an aluminum source and a magnesium source, wherein said one or more trapping metals comprises manganese, and wherein the amount of said naturally-occurring or synthetic hydrotalcite having one or more trapping metals ranges from about 1 wt % to about 30 wt % based on the total weight of said FCC catalyst and said naturally-occurring or synthetic hydrotalcite.

8. A composition suitable for removing one or more poisonous metals from hydrocarbons, said composition comprising a FCC catalyst and consisting essentially of naturally-occurring or synthetic hydrotalcite having a trapping metal dispersed on the outer surface thereof, wherein said naturally-occurring or synthetic hydrotalcite is prepared from sources selected from the group consisting of an aluminum source and a magnesium source, wherein said trapping metals is selected from the group consisting of manganese, and wherein the amount of said naturally-occurring or synthetic hydrotalcite ranges from about 1 wt % to about 30 wt % based on the total weight of said FCC catalyst and said naturally-occurring or synthetic hydrotalcite.

* * * * *